(12) United States Patent
Kaule et al.

(10) Patent No.: US 9,485,500 B2
(45) Date of Patent: Nov. 1, 2016

(54) VISUALIZING SPECIFIED SAFETY-CRITICAL INFORMATION IN A VEHICLE

(71) Applicant: Bayerische Motoren Werke Aktiengesellschaft, Munich (DE)

(72) Inventors: Dirk Kaule, Munich (DE); Hans-Ulrich Michel, Mallersdorf (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 109 days.

(21) Appl. No.: 14/596,545

(22) Filed: Jan. 14, 2015

(65) Prior Publication Data

US 2015/0201189 A1   Jul. 16, 2015

(30) Foreign Application Priority Data

Jan. 15, 2014   (DE) .......... 10 2014 200 559

(51) Int. Cl.
| | |
|---|---|
| *G08B 5/00* | (2006.01) |
| *H04N 17/00* | (2006.01) |
| *B60R 1/00* | (2006.01) |
| *G06F 3/14* | (2006.01) |
| *G06K 9/00* | (2006.01) |
| *G09G 5/36* | (2006.01) |
| *G09G 3/00* | (2006.01) |

(52) U.S. Cl.
CPC ............... *H04N 17/004* (2013.01); *B60R 1/00* (2013.01); *G06F 3/1423* (2013.01); *G06K 9/00805* (2013.01); *G06K 9/00832* (2013.01); *G09G 5/363* (2013.01); *H04N 17/002* (2013.01); *B60R 2300/20* (2013.01); *G06K 2209/03* (2013.01); *G09G 3/002* (2013.01); *G09G 2360/06* (2013.01); *G09G 2380/10* (2013.01)

(58) Field of Classification Search
CPC ................ H04N 17/004; G06K 2209/03
USPC .............. 340/815.4, 438, 439, 441; 348/189, 348/113, 115, 119, 474, 739
See application file for complete search history.

(56) References Cited

U.S. PATENT DOCUMENTS

| | | | |
|---|---|---|---|
| 8,188,846 B2 * | 5/2012 | Cooper | G02B 27/01 340/425.5 |
| 2016/0098861 A1 * | 4/2016 | Sisbot | G06T 19/006 345/633 |

* cited by examiner

*Primary Examiner* — Toan N Pham
(74) *Attorney, Agent, or Firm* — Crowell & Moring LLP

(57) ABSTRACT

A method is provided for visualizing specified safety-critical information in a vehicle. First display data are (AD_1) are determined, which are representative of a first image (B1) to be visualized, which provides the specified safety-critical information in a specified first signalization form, the first display data (AD_1) being determined free of specified safety regulations. The first display data (AD_1) are sent to a display unit (DISP) of the vehicle and test data (DD) are read out, which are representative of an image visualized on the display unit (DISP). The test data (DD) are checked and, if the test data (DD) are representative of a faulty provision of the specified safety-critical information, second display data (AD_2) are sent to the display unit (DISP), which are representative of a second image (B2) to the visualized, which provides the specified safety critical information in a specified second signalization form, which differs from the first signalization form. The second display data (AD_2) are determined while complying with the specified safety regulations.

11 Claims, 2 Drawing Sheets

VISUALIZING SPECIFIED SAFETY-CRITICAL INFORMATION IN A VEHICLE

CROSS REFERENCE TO RELATED APPLICATION

This application claims priority under 35 U.S.C. §119 from German Patent Application No. 10 2014 200 559.0, filed Jan. 15, 2014, the entire disclosure of which is herein expressly incorporated by reference.

BACKGROUND AND SUMMARY OF THE INVENTION

The invention relates to a method, a device, a computer program and a computer program product for visualizing specified safety-critical information in a vehicle, as well as to a corresponding vehicle.

In order to grant functional safety or comply with corresponding safety guidelines, in current vehicles, safety-critical information has to be reliably displayed on a display unit of the respective vehicle.

It is an object of the invention to contribute to a reliable display of safety-critical information on a display unit of a vehicle.

This and other objects are achieved by a method, and corresponding device, for visualizing specified safety-critical information in a vehicle. Display data are determined which are representative of a first image to be visualized, which provides the specified safety-critical information in a specified first signalization form. The determination of the first display data takes place free of specified safety regulations. The first display data are sent to a display unit of the vehicle. Test data are read out which are representative of an image visualized on the display unit. The test data are checked. If the test data are representative of a faulty providing of the specified safety-critical information, second display data are sent to the display unit. The second display data are representative of a second image to be visualized, which provides the specified safety-critical information in a specified second signalization form. The second signalization form differs from the first signalization form. The second display data are determined while complying with the specified safety regulations.

The display unit includes, for example, a display in a dashboard of the vehicle and/or a head-up display of the vehicle, where the information important to a driver are projected into the driver's field of vision.

The specified safety-critical information includes, for example, information which is displayed in vehicles in the driver's field of vision, such as information concerning vehicle speed, rotational engine speed, an open vehicle door and/or a defective light. As an alternative or in addition, the specified safety-critical information includes, for example, information concerning a faulty function of a safety-relevant driver assistance system, such as an automatic lane assist function and/or a function for highly automated driving with lateral and/or longitudinal control.

The specified safety-critical information is specified particularly by a control unit which is designed for determining the respective safety-critical information, for example, by means of suitable sensors.

The specified safety regulations are, for example, a result of an applicable safety standard for safety-relevant electrical/electronic systems in vehicles, such as the ISO 26262:2011.

The specified safety regulations make, for example, high demands on hardware and/or software, which is designed for the determination and/or display of the specified safety-critical information. As a result, it may not be possible to provide the specified safety-critical information while taking into account the specified safety regulations in the first signalization form; for example, because hardware and/or software, which complies with the specified safety regulations, does not have sufficient processing capacity for implementing the first signalization form in real time, and/or because hardware and/or software cannot be certified because, for example, a manufacturer wants to disclose neither the functioning of the hardware and/or software for a third-party certification by a monitoring institution, nor themselves, for example, comply with the SO 26262:2011 Standard.

However, the specified safety-critical information may be provided while taking into account the specified safety regulations in the specified second signalization form, for example, because the second signalization form requires fewer processing expenditures than the first signalization form.

Thus, when visualizing the specified safety-critical information, the specified safety regulations can be complied with in that the specified safety-critical information is provided in the specified second signalization form, if the specified safety-critical information was provided in a faulty manner. By examining the test data, it can be determined whether the specified safety-critical information was provided in a faulty manner in the first signalization form. This contributes to ensuring that the specified safety-critical information is reliably visualized at least in the specified second signalization form on the display unit of the vehicle.

Furthermore, for determining the first image to be visualized, hardware and/or software can be used which does not comply with the specified safety regulations but may possibly be more cost-effective and/or more efficient than hardware and/or software which complies with the specified safety regulations.

According to an advantageous further development, the first display data are determined such that the first image to be visualized comprises validation information. The test data are checked in that the validation information is checked.

Validation information particularly is information which cannot be perceived in a visualized image by the vehicle driver, for example, because it is imaged in an invisible edge area and/or because it is only imaged in an imaginary image area. As an alternative or in addition, it can also be imaged in the form of an imperceptible pattern in a visible image area.

The first image to be visualized will dynamically change, as required, for example, because the second signalization form takes dynamic image effects, such as shadowing, into account. It may therefore not be possible to check a visualization of the specified safety-critical information directly by means of the test data. The visualization of the validation information may possibly not change as dynamically as the visualization of the specified safety-critical information. As a result, the validation information can easily be checked by means of the test data. If the validation information is faulty, it is highly probable that the specified safety-critical information was also provided in a faulty fashion. It can therefore very easily be checked by means of the validation information whether the specified safety-critical information was provided in fashion.

According to a further advantageous development, the test data are checked a comparison with specified comparison data.

The specified comparison data comprise particularly comparison data for the validation information. As a result of such an actual-/desired-value comparison by use of the comparison data, it can very easily be determined whether the specified safety-critical information was provided in a faulty fashion, particularly by comparing the comparison data with a portion of the display data that represents the visualization of the validation information.

According to a further advantageous development, the specified first visualization form comprises a 3D visualization form, and the specified second visualization for comprises a 2D visualization form.

Specifically, the 3D visualization form is frequently computationally intensive, for example, because of an image synthesis (rendering), during which a hidden surface determination of objects, a surface computation (shading) and a computation of the light distribution takes place within the image to be visualized. The specified safety-critical information can therefore be displayed in the computationally intensive 3D visualization form and, in the event of a fault, can be visualized at least in the 2D visualization form.

According to a further aspect, the invention is characterized by a computer program for visualizing specified safety-critical information, the computer program being designed for implementing the method for visualizing specified safety-critical information or an advantageous further development of the method on a data processing device.

According to a further aspect, the invention is characterized by a computer program product that comprises the implementable program code. When implemented by a data processing device, the program code implements the method for visualizing specified safety-critical information or an advantageous further development of the method. The computer program particularly comprises a medium which is readable by the data processing device and on which the program code is stored.

Other objects, advantages and novel features of the present invention will become apparent from the following detailed description of one or more preferred embodiments when considered in conjunction with the accompanying drawings.

DETAILED DESCRIPTION OF THE DRAWINGS

Elements of the same construction or function are marked by identical reference numbers in all figures.

Figure 1:
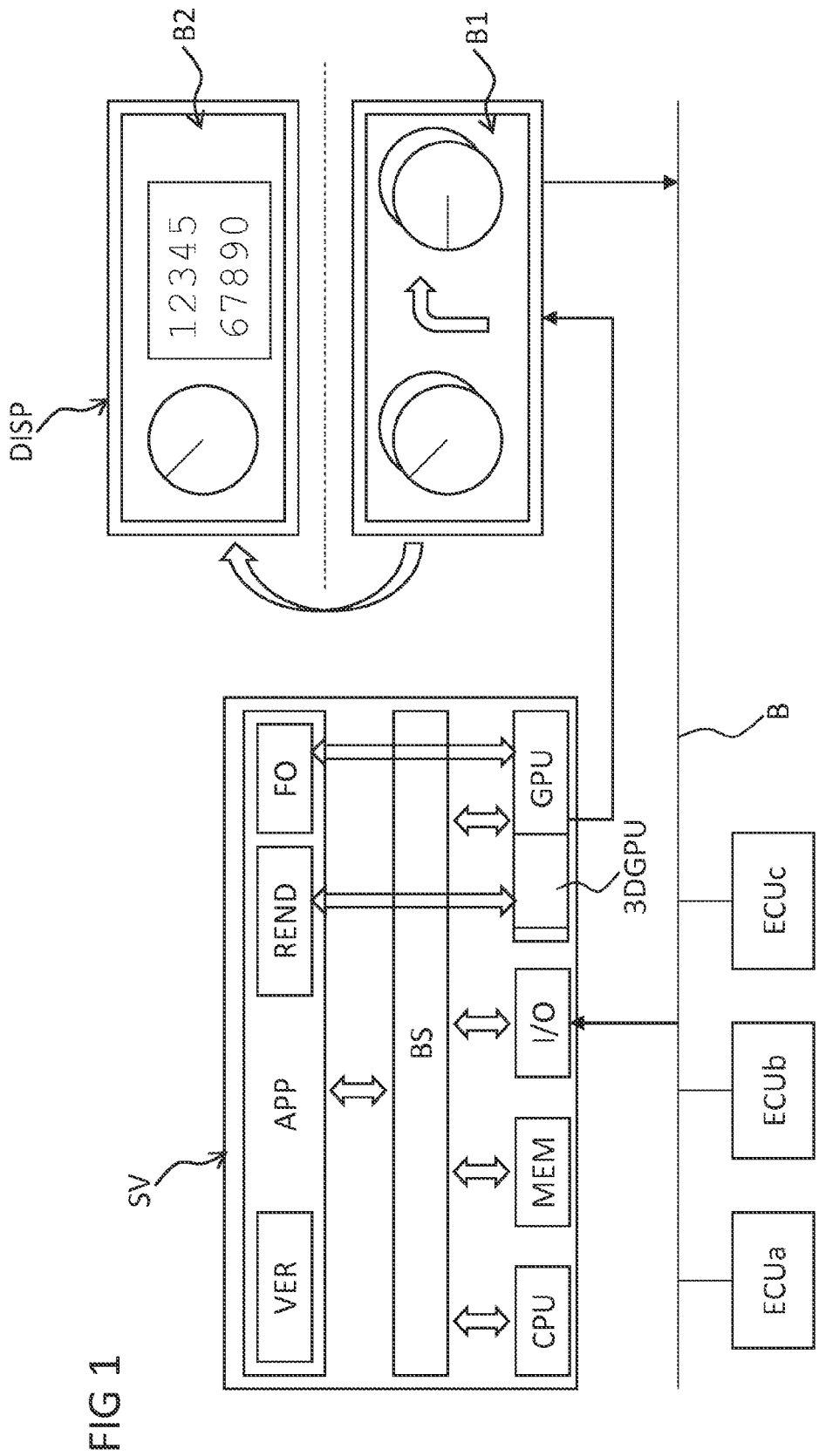
FIG. 1 is a block diagram view of a device for visualizing specified safety-critical information in a vehicle according to an embodiment of the invention.

FIG. 1 illustrates a device SV for visualizing safety-critical information in a vehicle. The specified safety-critical information comprises, for example, information which is displayed in vehicles in the driver's field of vision, such as information concerning vehicle speed, engine rotational speed, an open vehicle door and/or a defective light.

As an alternative or in addition, the specified safety-critical information comprises, for example, information concerning a faulty function of a safety-relevant driver assistance system, such as an automatic lane function and/or a function for highly automated driving with lateral and/or longitudinal control.

The device SV has, for example, a processing unit CPU and/or a graphic processing unit GPU. In addition, the device SV has a data and program memory MEM and at least one interface I/O. The processing unit CPU, the graphic processing unit CPU, the data and program memory MEM and/or the interface I/O may be constructed in one structural unit and/or distributed to two or more structural units.

By way of the interface I/O, for example, data from a bus B of the vehicle can be received or data can be sent by way of the bus B.

On the device SV, thus, for example, by way of the processing unit CPU, the graphic unit GPU and/or the data and program memory MEM, particularly an operating system BS can be implemented, on which several applications APPs can be implemented.

Such an application APP is, for example, a verification application VER, by which data can be checked. The verification application VER can be implemented particularly while complying with specified safety regulations. The specified safety regulations are, for example, a result of an applicable safety standard for safety relevant electric/electronic systems in vehicles, such as the ISO 26262 Standard.

A further such application APP is, for example, a rendering application REND, by which data can be determined which are representative of an image to be visualized. In particular, by use of the rendering application REND, computationally intensive visualization forms of the image to be visualized can be determined, such as a 3D visualization form. The rendering application REND is implemented in particular by use of a 3D graphic processing unit 3DGPU of the graphic unit GPU, for example, by way of OpenGL. OpenGL is a standard for a programming interface for developing 2D and 3D computer graphics. The OpenGL Standard describes commands which permit the representation of complex 3D scenes, particularly in real time.

A further application APP is, for example, a fault event application FO, by which also data can be determined which are representative of an image to be visualized. In contrast to the rendering application REND, the fault event application FO can be implemented particularly while complying with the specified safety regulations.

The device SV is, for example, further designed for sending, for example, by way of the graphic processing unit GPU, data to a display unit DISP of the vehicle for visualizing the image to be visualized, which was determined, for example, by way of the fault event application FO and/or the rendering application REND. The device SV is particularly designed for sending the data to the display unit DISP of the vehicle while complying with the specified safety regulations.

The display unit DISP is designed particularly for displaying the image to be visualized while complying with the specified safety regulations. For this purpose, the display unit DISP includes, for example, a display in a dashboard of the vehicle and/or a head-up display of the vehicle, where the information important to a vehicle driver is projected into the vehicle driver's field of vision.

In FIG. 1, as an example, a symbolic visualization of a first image B1 to be visualized, which image B1 was determined, for example, by means of the rendering application REND, and of a second image B2 to be visualized, which was determined, for example, by means of the fault event application FO, is shown on the display unit DISP.

Furthermore, the device SV is further developed, for example, for receiving, for example, by way of the interface I/O, by way of the bus B, data of the display unit DISP, which represent, for example an image visualized on the display unit DISP.

Furthermore, the device SV is further developed, for example, for receiving, for example, by way of the interface I/O, by way of the bus B, data from a sensor and/or from at least one control unit ECUa, ECUb, ECUc, which have, for example, the specified safety-critical information.

Figure 2:
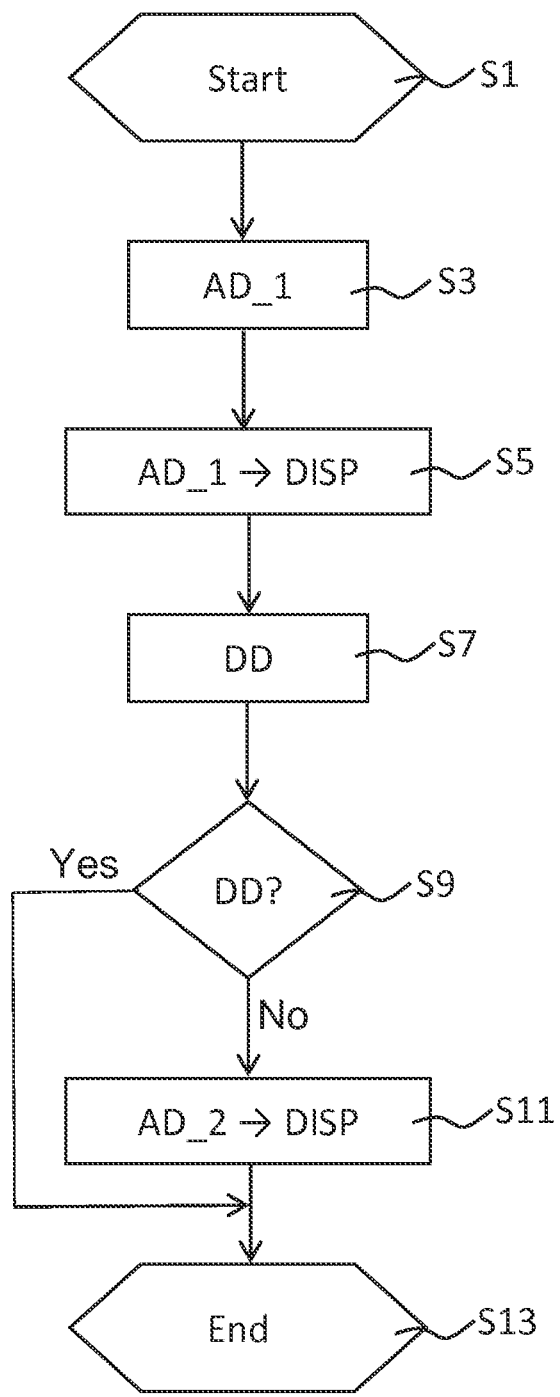
FIG. 2 is a view of a flow chart for visualizing the specified safety-critical information in the vehicle according to an embodiment of the invention.

For visualizing the safety-critical information in the vehicle, in particular, a program is stored in the data and program memory MEM of the device SV, which program can be processed by the device SV and will be explained in detail in the following by means of the flow chart of FIG. 2.

The program is started in Step S1, which, as required, variables can be initialized.

In Step S3, first display data AD_1 are determined, which are representative of the first image B1 to be visualized (see FIG. 1). The first image B1 to be visualized provides the specified safety-critical information in a specified first signalization form. In particular, the first display data AD_1 determined free of the specified safety regulations. The first display data AD_1 are determined, for example, by means of the rendering application REND by way of the 3D graphics processing unit 3DGPU of the graphics processing unit GPU of the device SV. The first visualization form includes, for example, a computationally intensive visualization form, for example, a 3D visualization form.

The first display data AD_1 are determined, for example, such that the first image B1 to be visualized comprises validation information. The validation information is, for example, information that cannot be perceived by the driver, for example, because it is imaged in an invisible edge area and/or because it is imaged in an imaginary image area. As an alternative or in addition, it can also be imaged in the form of an imperceptible pattern in a visible image area.

In a Step S5, the first display data AD_1 are sent to the display unit DISP of the vehicle, particularly by way of the graphics processing unit GPU.

In a Step S7, test data DD of the display unit DISP are read out, which are representative of an image visualized on the display unit DISP. The test data DD are, for example, read out by way of the bus B by way of the interface I/O from a display controller of the display unit DISP.

In a Step S9, it is checked whether the test data DD are representative of a faulty providing of the specified safety-critical information. The test data are, for example, checked by way of the verification application VER. The test data DD are, for example, checked in that the validation information is checked. For this purpose, for example, specified comparison data are provided which, for example, comprise comparison data for the validation information. By means of a comparison of the comparison data with a portion of the test data DD, which represents the visualization of the validation information, the test data DD can therefore be checked by a simple actual-/desired-value comparison.

If the test data DD are representative of a faultless providing of specified safety-critical information, the program will be continued in Step S13. If the test data DD are representative of a faulty providing of the specified safety-critical information, the program will be continued in a Step S11.

In Step S11, second display data AD_2 are sent to the display unit DISP. The second display data AD_2 are representative of a second image B2 (see FIG. 1) to be visualized, which provides the specified safety-critical information in a specified second signalization form which differs from the first signalization form. The second visualization form comprises, for example, a 2D visualization form.

The second display data AD_2 are determined while complying with the specified safety regulations, for example, by way of the fault event application FO.

The program is terminated in Step S13 and, as required, can be started again in Step S1.

The explained approach contributes to ensuring that safety-critical information will always be reliably visualized at least in the second signalization form and the specified safety regulations are therefore complied with. Furthermore, the safety-critical information is first provided in a first signalization form free of the specified safety regulations.

LIST OF REFERENCE SYMBOLS

3DGPU 3D graphic processing unit
AD_1 first display data
AD_2 second display data
APP application
B bus
B1 first image to be visualized
B2 second image to be visualized
BS operating system
CPU central processing unit
DD test data
DISP display unit
ECUa, ECUb, ECUc control unit
FO fault event application
GPU graphic processing unit
I/O interface
MEM data and program memory
REND rendering application
SV device
VER verification application The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for visualizing specified safety-critical information in a vehicle, the method comprising the acts of:
   determining first display data representative of a first image to be visualized, said first image providing the specified safety-critical information in a specified first signalization form, wherein the first display data are determined free of any specified safety regulations;
   sending the determined first display data to a display unit of the vehicle;
   reading-out test data representative of an image visualized on the display unit;
   checking if the read-out test data are representative of a faulty provision of the specified safety-critical information; and
   if the read-out test data are representative of the faulty provision of the specified safety-critical information, sending second display data to the display unit, which second display data are representative of a second image to be visualized, the second image providing the specified safety-critical information in a specified second signalization form differing from the first signalization form, wherein the second display data are determined while complying with the specified safety regulations.

2. The method according to claim 1, wherein:
the first display data are determined such that the first image to be visualized comprises validation information, and
the test data are checked via a checking of the validation information.

3. The method according to claim 2, wherein the test data are cheeked by comparing the test data with specified comparison data.

4. The method according to claim 3, wherein the specified first signalization form comprises a 3D visualization form, and the specified second signalization form comprises a 2D visualization form.

5. The method according to claim 2, wherein the specified first signalization form comprises a 3D visualization form, and the specified second signalization form comprises a 2D visualization form.

6. The method according to claim 1, wherein the specified first signalization form comprises a 3D visualization form, and the specified second signalization form comprises a 2D visualization form.

7. A computer program product, comprising a non-transitory computer readable medium having stored thereon program code segments executed to:
determine first display data representative of a first image to be visualized, said first image providing specified safety-critical information in a specified first signalization form, wherein the first display data are determined free of any specified safety regulations; send the determined first display data to a display unit of a vehicle; read-out test data representative of an image visualized on the display unit; cheek if the read-out test data are representative of a faulty provision of the specified safety-critical information; and
if the read-out test data are representative of the faulty provision of the specified safety-critical information, sending second display data to the display unit, which second display data are representative of a second image to be visualized, the second image providing the specified safety-critical information in a specified second signalization form differing from the first signalization form, wherein the second display data are determined while complying with the specified safety regulations.

8. The computer program product according to claim 7, wherein the program code segments further:
determine the first display data such that the first image to be visualized comprises validation information, and
check the test data via a checking of the validation information.

9. The computer program product according to claim 7, wherein the test data are cheeked by comparing the test data with specified comparison data.

10. The computer program product according to claim 7, wherein the specified first signalization form comprises a 3D visualization form, and the specified second signalization form comprises a 2D visualization form.

11. A vehicle, comprising:
means for visualizing specified safety-critical information in a vehicle, said means comprising a processor and a non-transitory computer readable medium in which program code segments are executed to:
determine first display data representative of a first image to be visualized, said first image providing the specified safety-critical information in a specified first signalization form, wherein the first display data are determined free of any specified safety regulations;
send the determined first display data to a display unit of the vehicle;
read-out test data representative of an image visualized on the display unit;
check if the read-out test data are representative of a faulty provision of the specified safety-critical information; and
if the read-out test data are representative of the faulty provision of the specified safety-critical information, sending second display data to the display unit, which second display data are representative of a second image to be visualized, the second image providing the specified safety-critical information in a specified second signalization form differing from the first signalization form, wherein the second display data are determined while complying with the specified safety regulations.

* * * * *